US012584858B2

(12) United States Patent
Sun et al.

(10) Patent No.: US 12,584,858 B2
(45) Date of Patent: Mar. 24, 2026

(54) RAPID FRESH DIGITAL-PATHOLOGY METHOD

(71) Applicant: National Taiwan University, Taipei (TW)

(72) Inventors: Chi-Kuang Sun, Taipei (TW); Bhaskar Jyoti Borah, Taipei (TW); Yao-Chen Tseng, Taipei (TW)

(73) Assignee: National Taiwan University, Taipei (TW)

( * ) Notice: Subject to any disclaimer, the term of this patent is extended or adjusted under 35 U.S.C. 154(b) by 727 days.

(21) Appl. No.: 17/963,247

(22) Filed: Oct. 11, 2022

(65) Prior Publication Data

US 2024/0118202 A1     Apr. 11, 2024

(51) Int. Cl.
*G01N 21/64* (2006.01)
*G01N 1/30* (2006.01)

(52) U.S. Cl.
CPC ........... *G01N 21/6428* (2013.01); *G01N 1/30* (2013.01); *G01N 2001/302* (2013.01); *G01N 2021/6439* (2013.01)

(58) Field of Classification Search
USPC ....................................................... 382/128
See application file for complete search history.

(56) References Cited

U.S. PATENT DOCUMENTS

2022/0015638 A1    1/2022  Zeng et al.

FOREIGN PATENT DOCUMENTS

WO      WO 2016/145366 A8      9/2016
WO      WO 2017/053825 A1      3/2017
WO      WO 2021/133847 A1      7/2021

OTHER PUBLICATIONS

Borah Bhaskar Jyoti et al. Super-speed multiphoton microscopy for mesoscopic volume imaing with ultra-dense sampling beyond Nyquist Limit Progress in Biomedical Optics and Imaging SPIE International Society for Optical Engineering Bellingham WA US vol. 11245 Feb. 17, 2020 (Feb. 17, 2020).

Luo, Teng et al. Enhanced Visualization of Hematoxylin and Eosin Stained Pathological Characteristics by Phasor Approach Analytical Chemistry US American Chemical Society Aug. 1, 2017 vol. 89, No. 17 pp. 9224-9231.

(Continued)

*Primary Examiner* — Jacky X Zheng
(74) *Attorney, Agent, or Firm* — Demian K. Jackson; Jackson IPG PLLC

(57) ABSTRACT

A rapid fresh digital-pathology (RFP) method for assessing an excised unfixed biological specimen stained with hematoxylin (H) or eosin (E) or both hematoxylin and eosin (HE) staining dyes. The RFP method is assisted by a rapid tissue staining (RTS) procedure which is performed on the excised unfixed biological specimen, involving a short fixation; an H-staining; a rinsing; a bluing; an E-staining; a rinsing; and finally, a covering of a stained specimen with a coverslip. The RFP method is further assisted by a multimodal nonlinear optical laser-raster-scanning approach to provide with a nonlinear multi-harmonic generation and/or a nonlinear multi-photon excitation fluorescence signal(s) for multi-channel digitization and real-time digital display of H- or E- or HE-specific histopathological features while providing a centimeter-scale imaging area, a submicron digital resolution, and a sustained effective data throughput of at least 500 Megabits per second (Mbps).

12 Claims, 4 Drawing Sheets

(56)     References Cited

OTHER PUBLICATIONS

Shi-Wei Chu Chi-Kuang Sun "Multimodal Nonlinear Microscopy"
Instruments Today Jun. 2001 vol. 22 No. 6 https://www.tiri.narl.
org.tw/Files/Doc/Publication/InstTdy/122/01220770.pdf.
EU Search report for EP 22200970.

RAPID FRESH DIGITAL-PATHOLOGY METHOD

TECHNICAL FIELD OF THE INVENTION

The present invention relates to a rapid fresh digital-pathology (RFP) method; more particularly, to assist with a training-free true-H&E rapid fresh digital-pathology procedure for histopathological assessment of an excised unfixed biological specimen stained with hematoxylin (H) or eosin (E) or both hematoxylin and eosin (HE) staining dyes.

BACKGROUND OF THE INVENTION

Although a formalin-fixed paraffin-embedded (FFPE) pathology provides ultimate reliability, it is not suitable for an intraoperative tumor assessment (ITA) as it takes up-to 1-2 days of processing time. With a way shorter assessment time, frozen section (FS)-pathology is presently the global standard for an ITA. However, FS involves cryosectioning, thus becomes labor intensive, and a single round consumes up-to 30 minutes of duration, eventually limiting feasible rounds of ITAs. Besides, FS-biopsy is susceptible to several artifacts that might compromise an assessment. There is thus a clear necessity for an FS-alternative which is sectioning-free, compact, fast, accurate, artifact-free, applicable to fresh specimens, as reliable as FFPE-biopsy, and most importantly, based on the global gold standard H&E dyes to make it reliably deployable without any deep learning and/or additional interpretation training to a pathologist.

In the paradigm of modern era computer-aided digital pathology, whole slide imaging (WSI) and stitched panoramic virtual slides (VSs) are rapidly evolving, which helps archive billions of FS/FFPE histopathology slides in digital form to assist with any-time re-assessment, and further enables a pathologist to perform rapid remote assessments with easy WSI-VS access from any location. However, to digitally preserve decent diagnostic reliability, it is important that there is no loss of resolution amidst the pixel pathway from the specimen to the digital display system. According to the practical guidelines from the Digital Pathology Association, a WSI VS with a typical ×20 magnification is usually acceptable for standard viewing and interpretation, while a base ×40 with a 0.5 micron ($\mu$m) digital resolution with a Nyquist-satisfied 0.25 $\mu$m pixel size at 24-bit color depth is often expected to be maintained. That requires a 1×1 square millimeter ($mm^2$) area to comprise $\geq$384M bits, which would extend to $\geq$38.4 giga (G) bits or 1.6 gigapixels for a 1 square centimeter (cm 2) area. For such ×40 or even ×20 objective lens with a high numerical aperture (NA, close to or greater than 1), the system field-of-view (FOV) is often limited to less than 1 $mm^2$, which mandates a series of stitching operations, which are expected to be artifact-free to not compromise the diagnostic reliability.

In the context of surgical pathology ITA, rapid evaluation is a primary requirement to minimize the net surgery time to keep the patient safe. Unlike physical sectioning involved in FS/FFPE, several prior arts relating to ITA-capable digital imaging modalities utilized optical virtual sectioning that enabled faster assessments. However, the prior arts either might not reach the Nyquist-satisfied gigapixel-sampled half-a-micron digital resolution to meet the state-of-the-art WSI standard, and/or might not enable a real-time large-field artifact-free stitching/mosaicking feature and/or a submicron gigapixel acquisition cum digital display ability with an uncompromised resolution across the "specimen to digital display" pixel pathway. Besides, while utilizing nuclei-staining dyes alternative to the gold standard hematoxylin, specific interpretation training might be required for a pathologist which might contribute to a lower accuracy compared to an FS/FFPE-biopsy. However, to perform optical sectioning of an opaque volumetric biological specimen wherein the nuclei are stained with hematoxylin dyes, one would require a nonlinear multi-harmonic generation approach to visualize the high-contrast cell nuclei.

It is noted that a few of the prior reported physical-sectioning-free fast-ITA approaches are capable of being applied in some specific surgical pathology applications. Stimulated Raman microscopy provides useful chemical information to examine cellular anomalies; however, it often encounters a low signal-to-noise ratio (SNR) and might not be suitable for rapidly investigating a centimeter-scale area. Optical coherence tomography, despite providing high-speed imaging, encounters poor spatial resolution, poor SNR, and poor contrast ratio. Light sheet fluorescence microscopy, confocal microscopy, and ultraviolet surface excitation microscopy are noteworthy approaches capable of optical-sectioning; however, might not work with dyes without fluorescence, such as the gold standard hematoxylin, especially if the biological specimen is thick and opaque in nature.

In a nutshell, the prior arts do not fulfill all users' requests on actual use in the context of optically-sectioned high-resolution high-throughput centimeter-scale laser-scanning of an HE-stained whole-mount biological specimen.

SUMMARY OF THE INVENTION

The purpose of the present invention is to introduce a method called rapid fresh digital-pathology or simply an RFP, a whole-specimen superficial imaging (WSSI) digital-ITA solution enabling 4 times faster assessment compared to the global standard of FS-biopsy, wherein the RFP is compatible with the standard H and E dyes analogous to a traditional FS- or FFPE-biopsy.

To achieve the above purpose, the present invention is an RFP method for histopathological assessment of an excised unfixed biological specimen stained with hematoxylin (H) or eosin (E) or both hematoxylin and eosin (HE) staining dyes, comprising an optical virtual sectioning via a multimodal nonlinear optical laser-raster-scanning to provide with a nonlinear multi-harmonic generation and/or a nonlinear multi-photon excitation fluorescence signal(s) for multi-channel digitization and real-time digital display of H- or E- or HE-specific histopathological features; a laser-raster-scanning single-tile field-of-view (FOV) of at least 1 $mm^2$ with an effective digital lateral resolution of less than 1 micron ($\mu$m) and an FOV-resolution ratio of greater than 1000; and a single-tile or a multi-tile-combined cumulative imaging area in a range of 1 $mm^2$ up-to 400 $mm^2$ with a sustained effective data throughput of at least 500 Megabits per second (Mbps).

The excised unfixed biological specimen is an opaque intact volumetric tissue with no fixation, no freezing, no physical sectioning, and no tissue clearing; and is selected from a group consisting of a liver tissue, a breast tissue, a pancreatic tissue, a brain tissue, a thymus tissue, a prostate tissue, a colon tissue, a lymph tissue, and a solid tissue.

In the RFP method, a rapid tissue staining (RTS) procedure enables H- or E- or HE-staining on the excised unfixed biological specimen.

The RTS procedure is performed on the excised unfixed biological specimen to be placed into a tissue chamber or a tissue container.

The RTS procedure is performed on the excised unfixed biological specimen, wherein a short fixation process is performed with a fixation agent; an H-staining process is performed with a Gill's hematoxylin solution and/or a Mayer's hematoxylin solution; a rinsing processes is performed with a distilled water and/or a cleaning solution; a bluing process is performed with an ammonia solution; an E-staining process is performed with an eosin solution; a rinsing process is performed with an alcohol solution and/or a cleaning solution; and a covering process of the excised unfixed biological specimen is performed with a coverslip.

The RTS procedure consumes a cumulative HE-staining time of less than 6 minutes.

The multimodal nonlinear optical laser-raster-scanning enables a point-scanning of a 10×10 mm$^2$ area in less than 2 minutes while preserving a pixel size of less than 170 nanometers (nm).

The RFP method consumes a staining time of less than 6 minutes and a scanning time of less than 2 minutes for an optically-sectioned superficial laser-raster-scanning of a 1 cm 2 specimen area, thus providing a cumulative assessment time of less than 8 minutes for the excised unfixed biological specimen.

The multimodal nonlinear optical laser-raster-scanning utilizes a fiber-based pulsed laser source with an emission spectrum in a range of 1000 nm to 1100 nm, wherein a third harmonic generation (THG) signal is collected originating from an H-staining, and/or a two-photon excitation fluorescence (TPEF) signal is collected originating from an E-staining; or, a chromium-forsterite (Cr:F)-based pulsed laser source with an emission spectrum in a range of 1200 nm to 1300 nm, wherein the THG signal is collected originating from the H-staining, and/or a three-photon excitation fluorescence (3PEF) signal is collected originating from the E-staining.

The multimodal nonlinear optical laser-raster-scanning utilizes a focusing lens, more specifically an objective lens with a numerical aperture of at least 0.7.

The multimodal nonlinear optical laser-raster-scanning utilizes a resonant scanner or a polygon scanner for a fast-axis scanning providing with a line rate of at least 4 kilohertz.

The multi-tile-combined cumulative imaging area is assisted by a motorized two-dimensional electronic stage unit consisting of at least two electronic linear translational stages attached perpendicular to each other.

BRIEF DESCRIPTION OF THE DRAWINGS

The present invention will be better understood from the following detailed description of the preferred embodiment according to the present invention, taken in conjunction with the accompanying drawing, in which.

DESCRIPTION OF THE PREFERRED EMBODIMENT

The following description of the preferred embodiment is provided to understand the features and the structures of the present invention.

Reference can be made to FIG. 1 to FIG. 4, which are a view showing an RFP method; a view showing the RFP method assisted by a multimodal nonlinear optical laser-raster-scanning approach; a view showing a workflow of the RTS protocol; and a view showing an image example obtained with the RFP method. As shown in the figures, the present invention is an RFP method [1] for histopathological assessment of an excised unfixed biological specimen stained with hematoxylin (H) or eosin (E) or both hematoxylin and eosin (HE) staining dyes, comprising:

(a) an optical virtual sectioning via a multimodal nonlinear optical laser-raster-scanning to provide with a nonlinear multi-harmonic generation and/or a nonlinear multi-photon excitation fluorescence signal(s) for multichannel digitization and real-time digital display of H- or E- or HE-specific histopathological features [27];

(b) a laser-raster-scanning single-tile field-of-view (FOV) of at least 1 mm$^2_{[a1]}$ with an effective digital lateral resolution of less than 1 micron (μm) and an FOV-resolution ratio of greater than 1000; and (c) a single-tile or a multi-tile-combined cumulative imaging area in a range of 1 mm$^2$ up to 400 mm$^2$ with a sustained effective data throughput of at least 500 Megabits per second (Mbps).

The excised unfixed biological specimen is an opaque intact volumetric tissue with no fixation, no freezing, no physical sectioning, and no tissue clearing, and is selected from a group of tissues consisting of a liver tissue, a breast tissue, a pancreatic tissue, a brain tissue, a thymus tissue, a prostate tissue, a colon tissue, a lymph tissue, and a solid tissue.

In the RFP method [1], an RTS [3] procedure enables H- or E- or HE-staining on the excised unfixed biological specimen.

The RTS [3] procedure is performed on the excised unfixed biological specimen to be placed into a tissue chamber or a tissue container [12].

Figure 1:
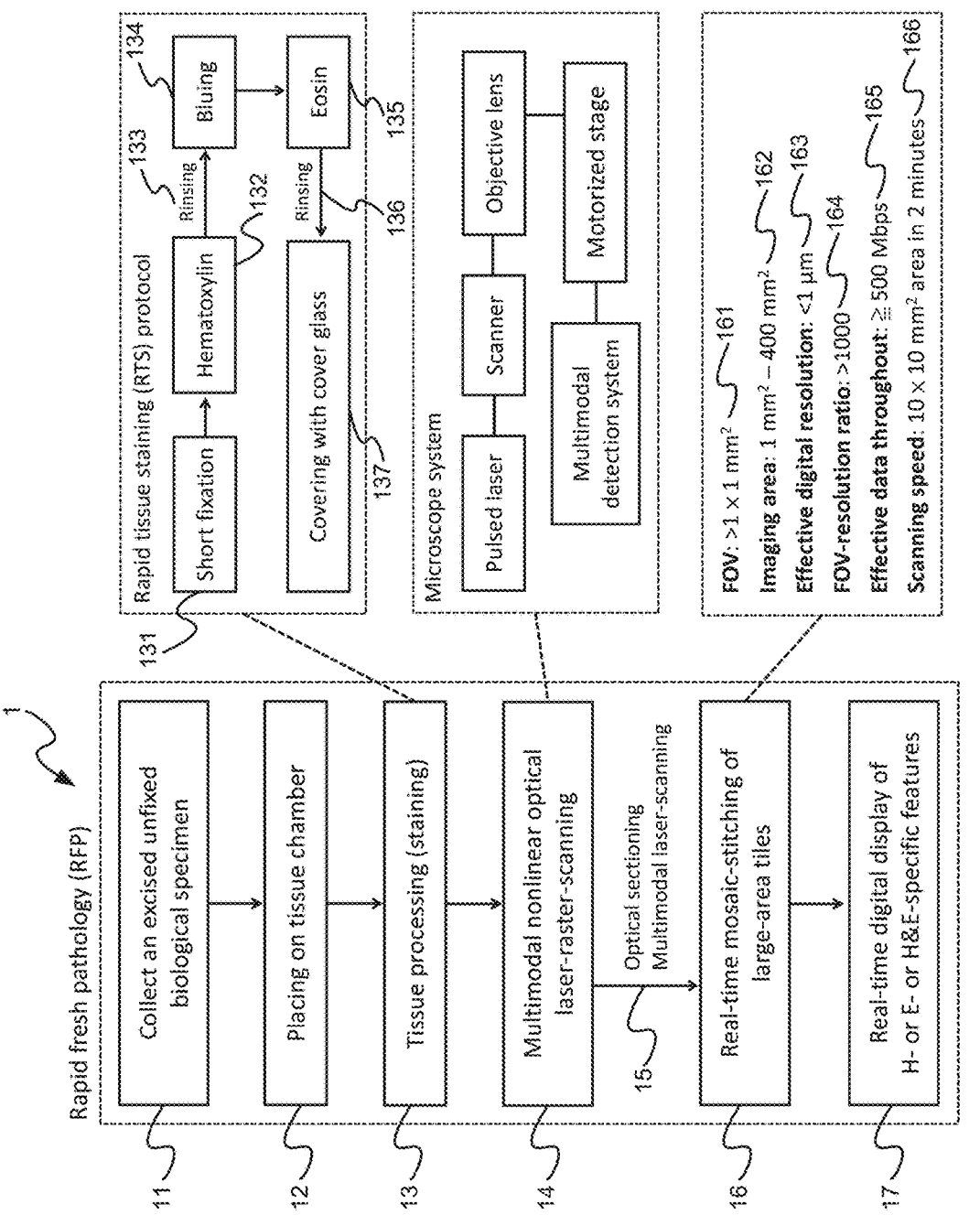
FIG. 1 is the view showing the rapid fresh digital-pathology (RFP) method.
Figure 2:
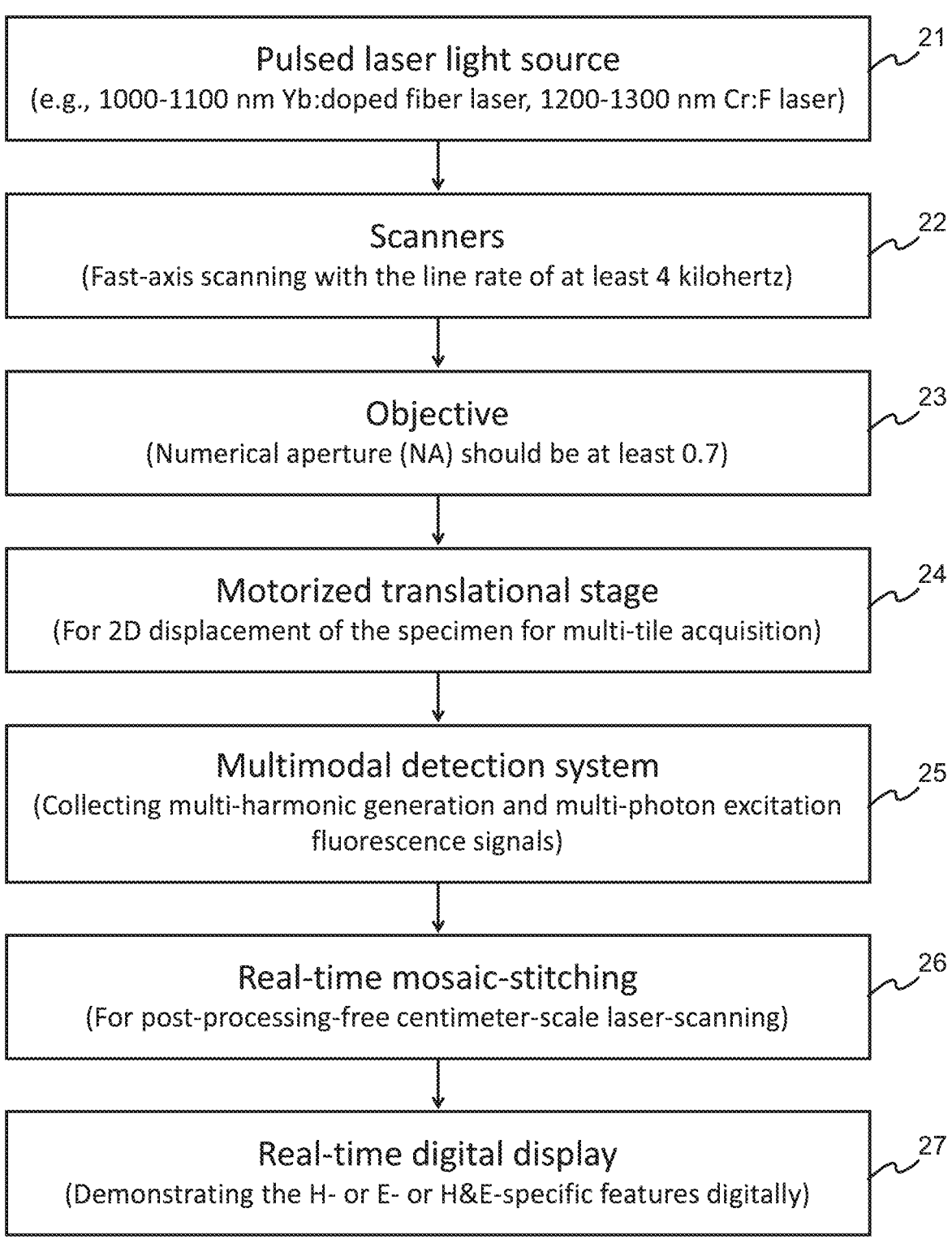
FIG. 2 is the view showing the RFP method assisted by the multimodal nonlinear optical laser-raster-scanning approach.
Figure 3:
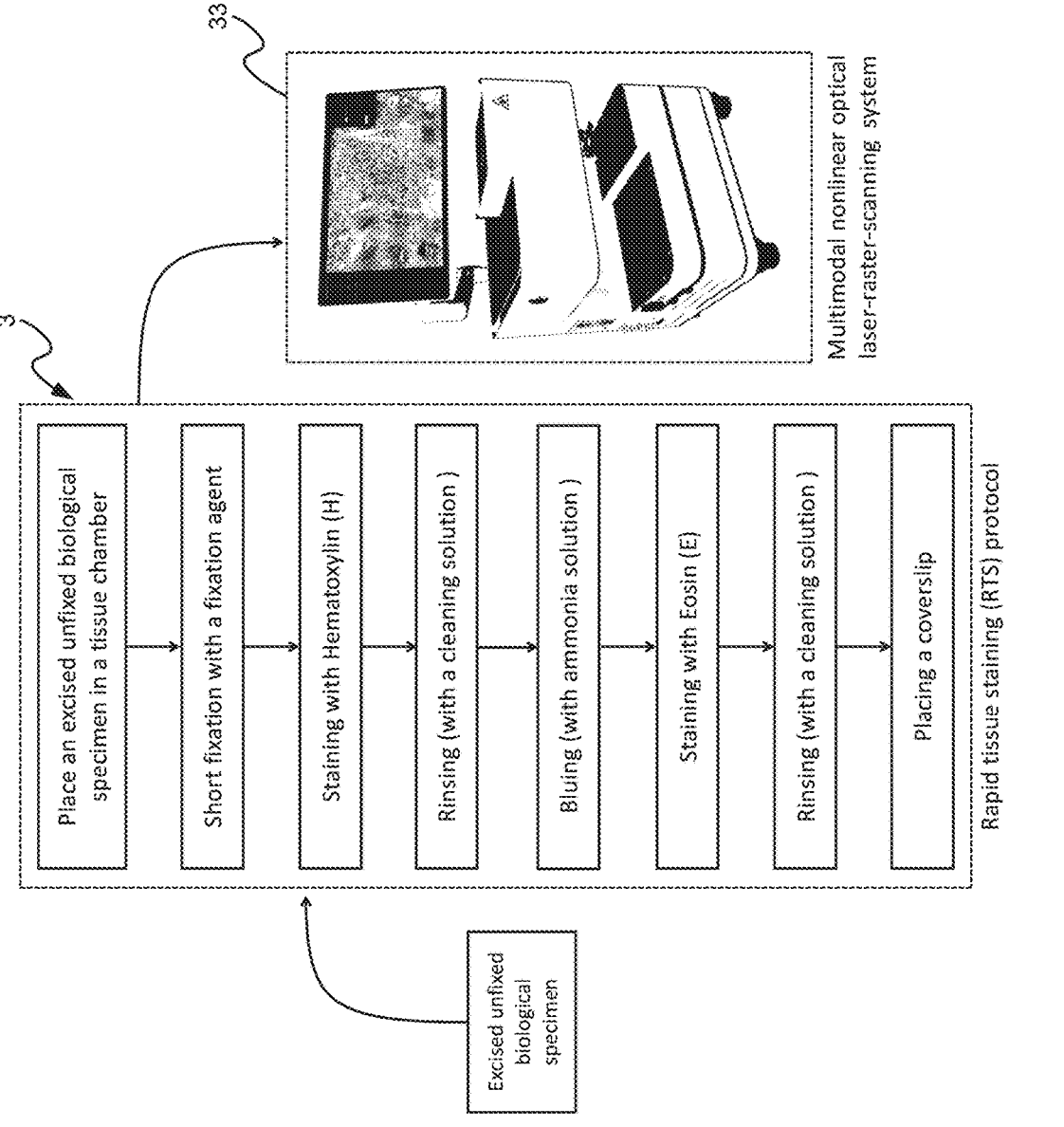
FIG. 3 is the view showing the workflow of the rapid tissue staining (RTS) protocol.

In FIG. 2 and FIG. 3, an RFP [1] procedure assisted by a sub-6-minute RTS protocol mounts an excised tissue in a chamber made of an iSpacer attached to a microscope slide. The RTS [3] consumes less than 6 minutes of duration, which involves a short fixation [131], two phases of H-based nuclei staining [132], intermediate rinsing [133,], bluing [134], E-staining [135], and final rinsing [136]. Once the RTS [3] is completed, a coverslip is added [137], and imaging is performed under a multimodal nonlinear optical laser-raster-scanning system [33].

The RFP method [1] consumes a staining time of less than 6 minutes and a scanning time of less than 2 minutes for an optically-sectioned superficial laser-raster-scanning of a 1 square centimeter specimen area, thus providing a cumulative assessment time of less than 8 minutes for the excised unfixed biological specimen.

It is noted that a multimodal nonlinear optical laser-raster-scanning is deployed to detect nonlinear multi-harmonic generation and/or a nonlinear multi-photon excitation fluorescence signal(s) for multichannel digitization and real-time digital display of H- or E- or HE-specific histopathological features [17].

The properties of the multimodal nonlinear optical laser-raster-scanning include: (1) laser-raster-scanning single-tile FOV of at least 1 mm² with an effective digital lateral resolution of less than 1 μm and an FOV-resolution ratio of greater than 1000; (2) a single-tile or a multi-tile-combined cumulative imaging area in a range of 1 mm² up to 400 mm² with a sustained effective data throughput of at least 500 Megabits per second (Mbps); and (3) a point-scanning of a 10×10 mm² area enabled in less than 2 minutes while preserving a pixel size of less than 170 nanometers (nm) [166]. And it is noted that the multi-tile-combined process is performed by real-time mosaic stitching for post-processing-free centimeter scale laser scanning [26]$_{[a2]}$.

The multimodal nonlinear optical laser-raster-scanning utilizes a focusing lens, more specifically an objective lens with a numerical aperture of at least 0.7 [23].

The multimodal nonlinear optical laser-raster-scanning [14] utilizes a resonant scanner or a polygon scanner for a fast-axis scanning provided with a line rate of at least 4 kilohertz.

The multi-tile-combined cumulative imaging area is assisted by a motorized two-dimensional electronic stage unit consisting of at least two electronic linear translational stages attached perpendicular to each other.

The multimodal nonlinear optical laser-raster-scanning utilizes
(a) a fiber-based pulsed laser source [21] with an emission spectrum in a range of 1000 nm to 1100 nm, wherein a third harmonic generation (THG) signal is collected originating from an H-staining and/or a two-photon excitation fluorescence (TPEF) signal is collected originating from an E-staining; or
(b) a chromium-forsterite (Cr:F)-based pulsed laser source [21] with an emission spectrum in a range of 1200 nm to 1300 nm, wherein the THG signal is collected originating from the H-staining and/or a three-photon excitation fluorescence (3PEF) signal[25] $_{[a3][!ILF4]}$ is collected originating from the E-staining.

Figure 4:
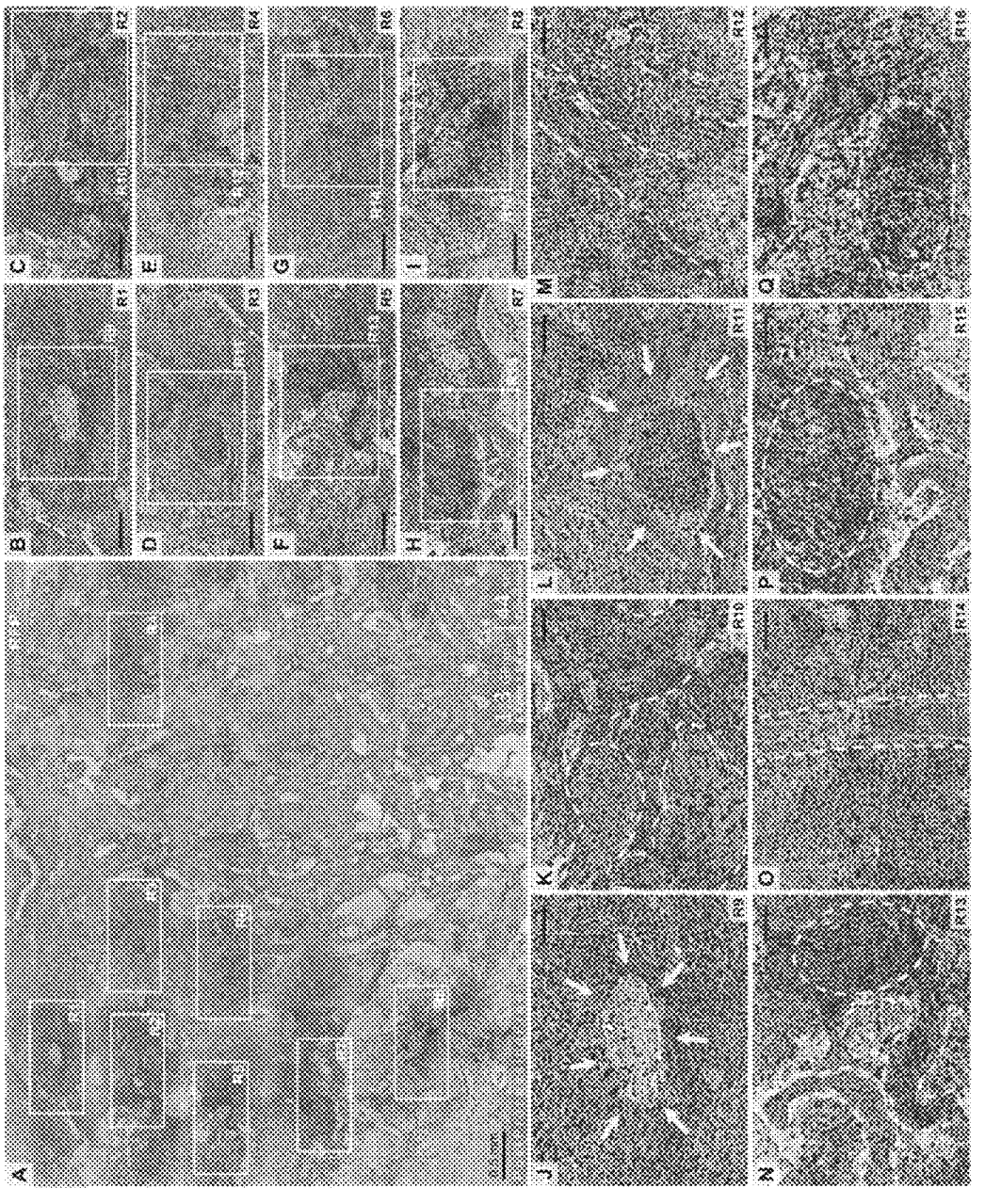
FIG. 4 is the view showing an image example obtained with the RFP method.

In FIG. 4, the image example is obtained by conducting the RFP [1] to a fresh human glioma tissue. Some specific histopathological features are seen in the large centimeter-scale image and the magnified images, wherein (A) is a 1.3 Gigapixel color-remapped RFP image with a 0.5 mm of scale bar, 6.4×5.6 mm² of FOV, 44 seconds of cumulative imaging time, around 30 M/s of true effective pixel rate, and greater than 1 mm²/s of true effective scanning rate. (B)-(I) are cropped and enlarged ROIs R1-8 marked in (A), wherein each ROI is with a pixel number of 6700×3300 and a scale bar of 150 μm. (J)-(Q) are cropped and enlarged ROIs R9-16 marked in (B)-(I), wherein each ROI is with a pixel number of 3200×2500 and a scale bar of 70 μm. Distribution, shape, and size of cell nuclei and other structural details, such as vessels, are visualized in (B)-(Q). White-dashed curves mark vessel structures. White-dashed circles show examples of significantly hypercellular regions. Atypical cellularity is significant inside some atypical vessels in (K), (M), (N), (Q), indicating signs of microvascular proliferation.

In the present invention, a method called rapid fresh digital-pathology or simply an RFP is introduced, which is a whole specimen superficial imaging digital-ITA solution enabling 4 times faster assessment compared to the global standard of FS-biopsy. The RFP is compatible with the standard H and E dyes analogous to a traditional FS/FFPE-biopsy. It is noted that training-free blind assessments considering a total of 50 human brain specimens (normal and glioma specific) reveal 100% success in identification of a tumor, indicating an FS/FFPE-comparable accuracy with sensitivity and specificity of both 100%.

In the present invention, the cumulative time for staining, scanning, and displaying a 1 cm 2 area is around 8 minutes, wherein the rapid staining procedure takes less than 6 minutes, and the subsequent scanning and display process consumes around 2 minutes of duration. The cumulative assessment time can be further reduced with an even optimized staining protocol.

In the present invention, the demonstration of the RFP is dedicated to excised fresh human brain specimens to investigate tumor tissues. Specifically for soft and frangible fresh brain specimens, the RTS is implicated making use of traditional H&E dyes. It is noted that the RFP holds a tremendous potential to be applied to other types of biological specimens, such as but not limited to breast, prostate, skin, etc., to make the relevant ITAs fast, accurate, and reliable.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A rapid fresh digital-pathology (RFP) method for histopathological assessment of an excised unfixed biological specimen stained with hematoxylin (H) or eosin (E) or both hematoxylin and eosin (HE) staining dyes, comprising:
  an optical virtual sectioning via a multimodal nonlinear optical laser-raster-scanning to provide with a nonlinear multi-harmonic generation and/or a nonlinear multi-photon excitation fluorescence signal(s) for multichannel digitization and real-time digital display of H- or E- or HE-specific histopathological features;
  a laser-raster-scanning single-tile field-of-view (FOV) of at least 1 square millimeter (mm²) with an effective digital lateral resolution of less than 1 micron (μm) and an FOV-resolution ratio of greater than 1000; and
  a single-tile or a multi-tile-combined cumulative imaging area in a range of 1 mm² up to 400 mm² with a sustained effective data throughput of at least 500 Megabits per second (Mbps).

2. The RFP method according to claim 1, wherein said excised unfixed biological specimen is an opaque intact volumetric tissue with no fixation, no freezing, no physical sectioning, and no tissue clearing; and is selected from a group consisting of a liver tissue, a breast tissue, a pancreatic tissue, a brain tissue, a thymus tissue, a prostate tissue, a colon tissue, a lymph tissue, and a solid tissue.

3. The RFP method according to claim 1, wherein a rapid tissue staining (RTS) procedure enables H- or E- or HE-staining on said excised unfixed biological specimen.

4. The RFP method according to claim 3, wherein said RTS procedure is performed on said excised unfixed biological specimen to be placed into a tissue chamber or a tissue container.

5. The RFP method according to claim 3, wherein said RTS procedure is performed on said excised unfixed biological specimen, wherein:
  a short fixation process is performed with a fixation agent;
  an H-staining process is performed with a Gill's hematoxylin solution and/or a Mayer's hematoxylin solution;
  a rinsing processes is performed with a distilled water and/or a cleaning solution;
  a bluing process is performed with an ammonia solution;
  an E-staining process is performed with an eosin solution;

a rinsing process is performed with an alcohol solution and/or a cleaning solution; and a covering process of said excised unfixed biological specimen is performed with a coverslip.

6. The RFP method according to claim 3, wherein said RTS procedure consumes a cumulative HE-staining time of less than 6 minutes.

7. The RFP method according to claim 1, wherein said multimodal nonlinear optical laser-raster-scanning enables a point-scanning of a 10×10 mm² area in less than 2 minutes while preserving a pixel size of less than 170 nanometers (nm).

8. The RFP method according to claim 1, wherein a staining time of less than 6 minutes and a scanning time of less than 2 minutes are consumed for an optically-sectioned superficial laser-raster-scanning of a 1 square centimeter specimen area, thus providing a cumulative assessment time of less than 8 minutes for the excised unfixed biological specimen.

9. The RFP method according to claim 1, wherein said multimodal nonlinear optical laser-raster-scanning utilizes:

a fiber-based pulsed laser source with an emission spectrum in a range of 1000 nm to 1100 nm, wherein a third harmonic generation (THG) signal is collected originating from an H-staining and/or a two-photon excitation fluorescence (TPEF) signal is collected originating from an E-staining; or, a chromium-forsterite (Cr:F)-based pulsed laser source with an emission spectrum in a range of 1200 nm to 1300 nm, wherein the THG signal is collected originating from the H-staining and/or a three-photon excitation fluorescence (3PEF) signal is collected originating from the E-staining.

10. The RFP method according to claim 1, wherein said multimodal nonlinear optical laser-raster-scanning utilizes a focusing lens, more specifically an objective lens with a numerical aperture of at least 0.7.

11. The RFP method according to claim 1, wherein said multimodal nonlinear optical laser-raster-scanning utilizes a resonant scanner or a polygon scanner for a fast-axis scanning providing with a line rate of at least 4 kilohertz.

12. The RFP method according to claim 1, wherein said multi-tile-combined cumulative imaging area is assisted by a motorized two-dimensional electronic stage unit consisting of at least two electronic linear translational stages attached perpendicular to each other.

* * * * *